United States Patent Office 2,916,795
Patented Dec. 15, 1959

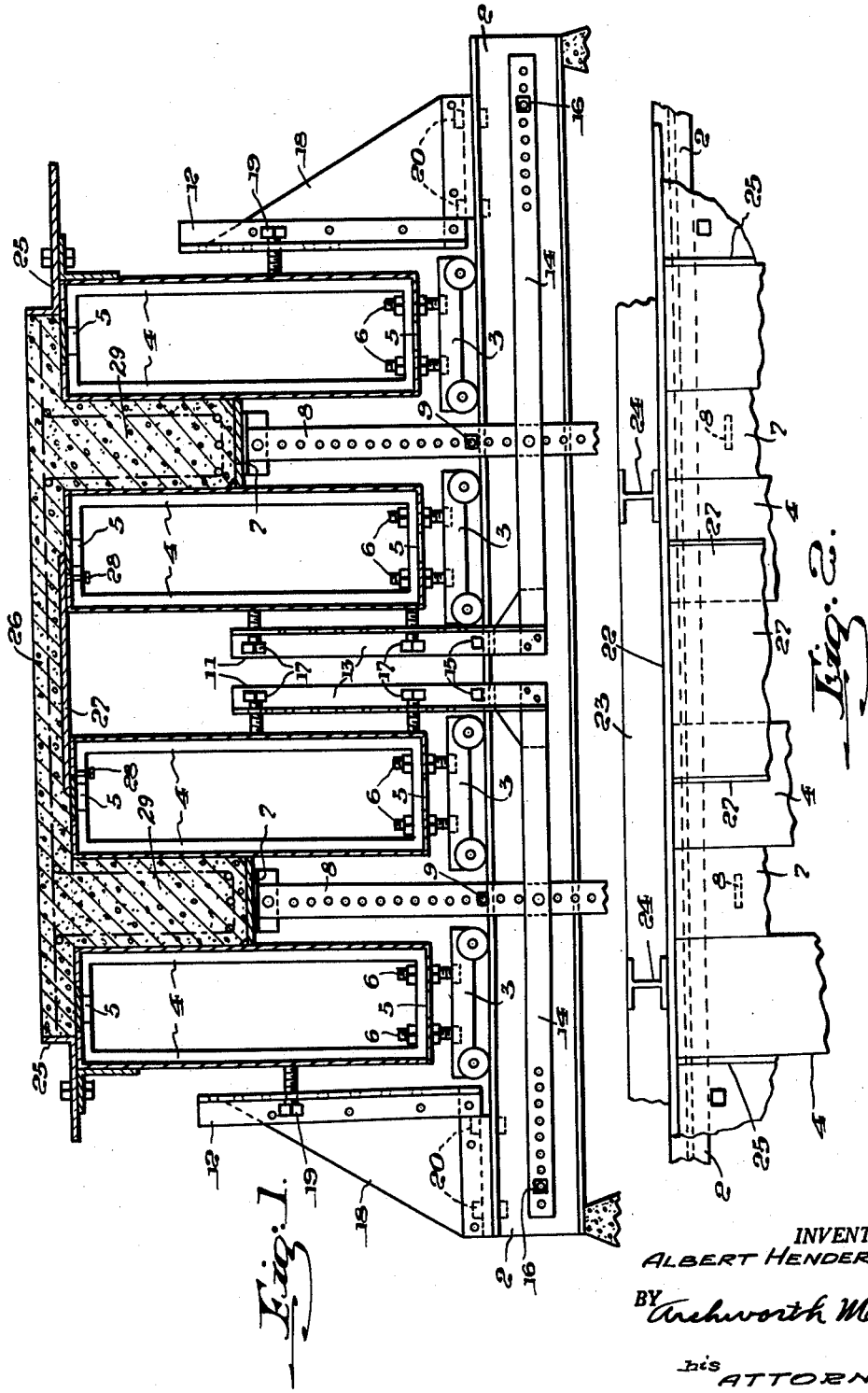

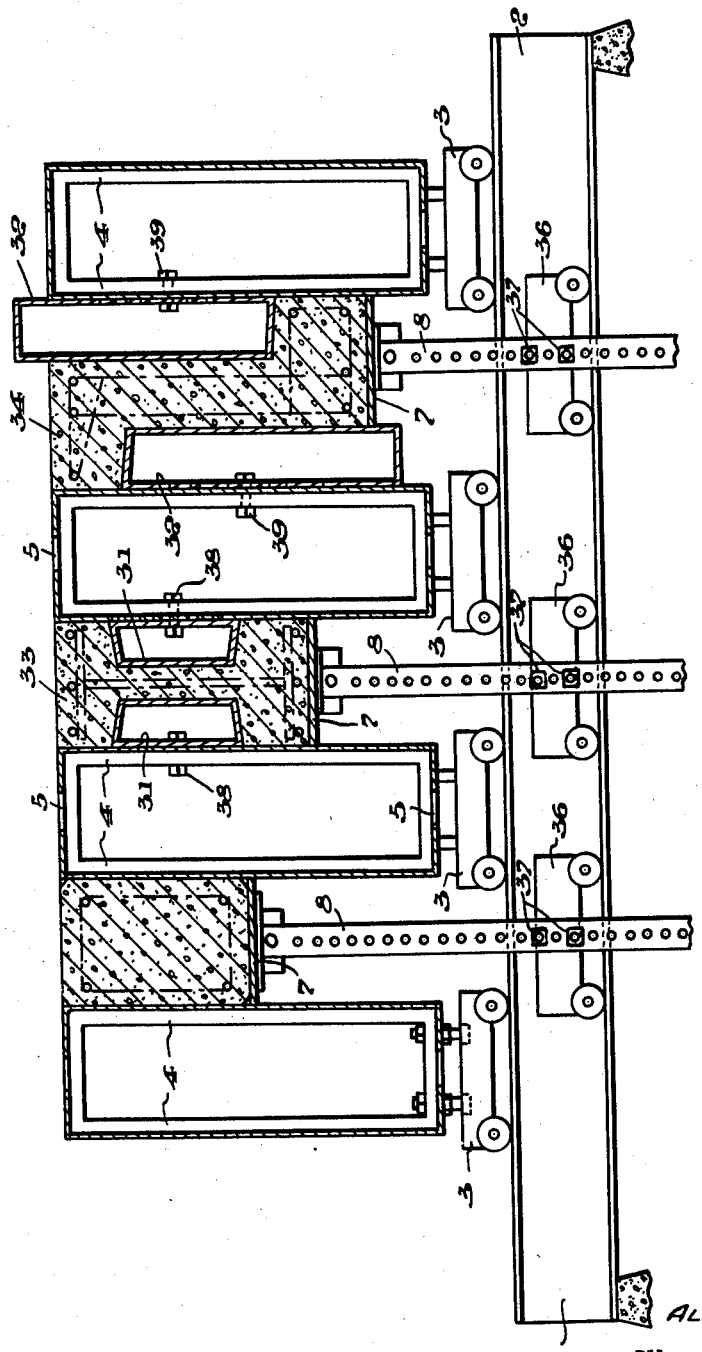

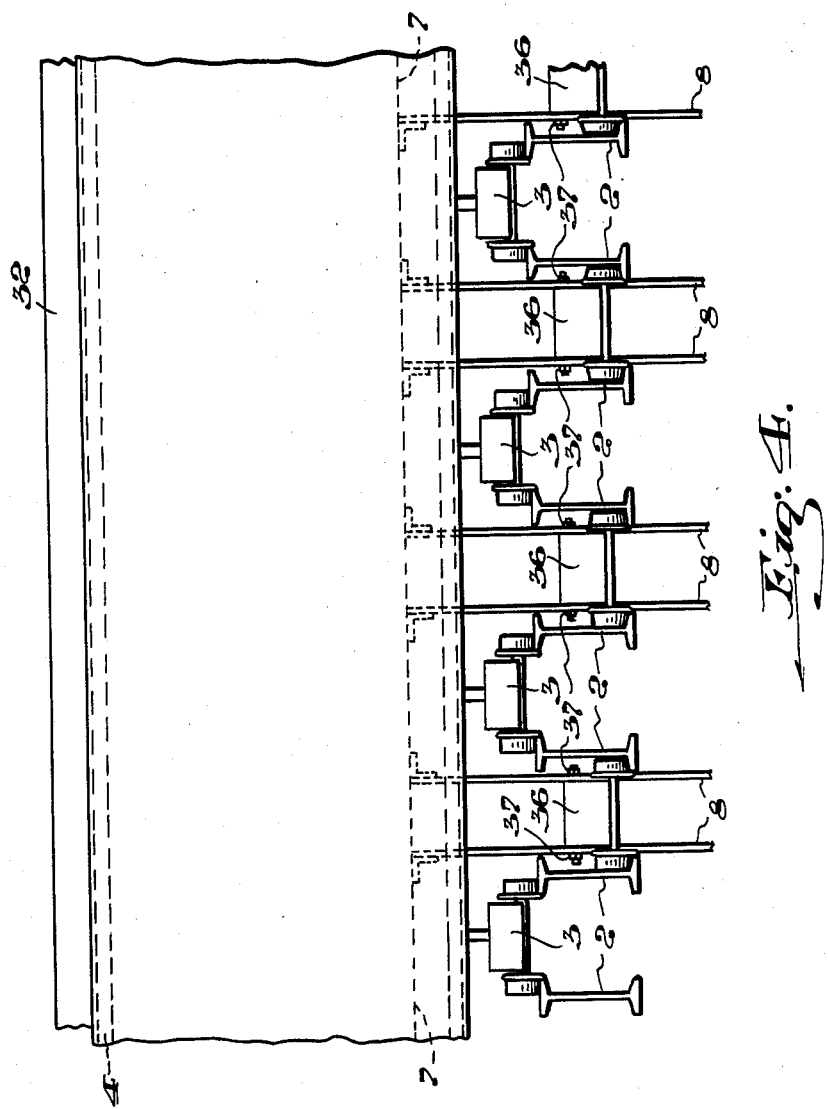

2,916,795

APPARATUS FOR MOLDING REINFORCED CONCRETE BUILDING SLABS, COLUMNS AND GIRDERS

Albert Henderson, Pittsburgh, Pa.

Application May 3, 1957, Serial No. 656,861

9 Claims. (Cl. 25—121)

The apparatus of this application is particularly suitable for making reinforced concrete building members including rectangular columns and girders, I-beams, Z-beams, H-beams, T-beams, channels and double T slabs, as well as wall panels, so that an entire building shell, including a frame, roof and floor slabs and wall panels can be made by my molding apparatus of standardized parts.

Various structural concrete building shapes that can be made by this apparatus are illustrated in my co-pending patent application Ser. No. 545,891, filed November 9, 1955, and the idea of making concrete building units and frames of various shapes in the same molds that mold the legs of the channel or double T floor or roof slabs is disclosed in connection with Figures 1 to 16 of my co-pending application Ser. No. 470,674, filed November 23, 1954, now abandoned. The arrangement there shown and here shown permits reinforcing steel in cage form to be standardized for the concrete columns, girders, beams and legs of the floor and roof slabs.

Figure 1 is a vertical section view through mold apparatus that embodies my invention.

Fig. 2 is a partial plan view thereof.

Fig. 3 shows a modification of the apparatus of Fig. 1.

Figure 4 is a side view of the structure of Fig. 3.

Referring first to Figure 1, the molding apparatus is shown as supported on steel I-beams 2 that serve as track-ways for trucks 3 upon which the mold side walls 4 are supported. These molds 4 may suitably be perhaps 60 feet in length, in directions transversely of the beams 2, and there will perhaps be five rows of trucks 3 positioned on five pairs of tracks 2 (Fig. 4), for supporting each mold member 4. The molds 4 are all suitably of box-like form and steam may be introduced therein in order the facilitate or hasten the hardening of the molded concrete. Hand holes 5 are provided in the upper and lower ends of the box-like mold members for access to bolts that extend through the side or top walls of the molds. The walls 4 are vertically adjustable on the trucks 3 by bolts 6.

Pallets 7 serve as mold bottoms and are supported on vertical bars 8 which are in turn supported upon the beams 2 by bolts 9 that extend through holes in the uprights 8. The spacing of the holes in the uprights may suitably be 2 inches center-to-center, to provide for graduated vertical adjustments of the mold bottoms 7.

The mold members 4 are laterally braced by clamping members 11 and 12. The clamping devices 11 each comprises a vertical bar 13 and a horizontal bar 14 that are rigidly secured together in right angular relationship. Each bar 13 is vertically supported by a bolt 15 on a rail 2 and the leg 14 of the angle is bolted at 16 to the beam 2. The angles 13—14 are adjustably positioned longitudinally of the rails 2 by insertion of the bolts 16 through desired ones of the holes. Screws 17 are threaded through holes in the angles 13, at adjustable heights, to clamp the mold side walls against the pallets or mold bottoms 7, in opposition to braces 18 that have clamping screws 19 adjustable vertically on the braces, the braces being bolted at 20 to the beams 2. A plate 22 (Fig. 2), serves as a vertical mold wall at each end of the group of molds 4 and is suitably supported by a beam 23 and braces 24. Angles 25 serve as mold walls for the edges of a concrete slab 26. A filler plate 27 is employed to bridge the space between the inner molds 4. Bolts 28 carried by the plate 27 extend loosely through the slots in the upper ends of the mold boxes 4 so as to permit adjustment of the two adjacent mold boxes toward and from one another. Also, the bolts hold the plate 27 against being pulled away from the mold by suction, when the slab is being lifted from the mold.

It will also be understood that when a simple slab is to be formed, instead of a slab with integrally formed beams or girders as in Fig. 1, bridging plates such as 27 will be placed over the mold cavities, or the pallets 7 will be raised to the same plane as the tops of the molds 4 and thus serve as mold bottom members. The integrally-formed beam portions 29 of the casting will be of a depth or vertical dimension dependent upon the plane to which the pallets 7 are adjusted, and will be of a thickness determined by the positions of the trucks 3 and such minor adjustments as may be effected by the clamping screws 17 and 19.

The slab 26 is extended beyond the two legs of the casting, to the edge mold members 25, thus forming cantilever extensions beyond the legs of the slab, and enabling a thinner section of web to be used.

Referring now to Figures 3 and 4, I show a structure similar to that of Fig. 1, but wherein the mold members of Fig. 1 are utilized in the casting of beams and girders of other shapes. Suitable core members such as 31 and 32 are provided for forming I-beams 33 and Z-beams 34, it being understood of course, that cores of other contours could be placed against the mold sidewalls 4, and extend either for part length or full length of the beam mold cavity. The cores 31 and 32 are vertically adjustable to desired heights and the pallet-like mold bottoms 7 are likewise supported for vertical adjustment. The pallets or mold bottoms 7 may be of various widths from 4 inches to 24 inches, for example and, of course, the mold side walls will be held tightly against the edges of the mold bottoms when the concrete is being poured. In making the shapes shown in Fig. 3, the pouring of the concrete ceases when it completely fills the cavity between the mold side walls instead of pouring being continued to form a floor or slab as in Fig. 1.

Another variation in Fig. 3 from that shown in Fig. 1 results from the provision of additional trucks 36 that roll along the bottom flanges of the I beams 2. The vertical bars 8 that support the pallets 7 are in turn supported upon the trucks 36 by bolts 37. By this arrangement, the whole apparatus can readily be shifted longitudinally of the beams 2.

The holes in the mold side walls through which the core-holding bolts 38 and 39 extend can be plugged or covered with tape when no cores are being used. Also, the reinforcement steel, both in the case of Fig. 1 and Fig. 3, will be made in the form of cages after the manner shown in my co-pending application Ser. No. 470,674, filed November 23, 1954, and placed in the mold cavities previous to pouring of the concrete.

I claim as my invention:

1. Apparatus for forming concrete building members of elongated form, that comprises pairs of mold sides which have longitudinally-extending cores, separately-formed mold bottoms cooperating with said sides, to form an upwardly-exposed mold cavity between each pair of mold sides, trackways disposed in a horizontal plane below the mold bottoms and sides and extending transversely of the mold cavities, rows of trucks movable along the trackways, below the mold sides, with each row supporting one of said mold sides at various points along the bottom face of the side and movable independently of the other rows, and rows of uprights mounted on the trackways and at their upper ends supporting the mold bottoms, there being a row of these uprights which support each mold bottom at various points longitudinally of the bottom.

2. Apparatus as recited in claim 1, wherein clamping means are provided on the trackways for clamping the mold sides against the edges of the mold bottoms.

3. Apparatus as recited in claim 1, wherein means are provided on the mold-side trucks, for plumbing the mold sides.

4. Apparatus for forming concrete building members of elongated form, that comprises a pair of vertical mold sides which are provided on their inner faces with cores that extend longitudinally of the sides, a separately-formed mold bottom between said sides, to form a mold cavity that is upwardly exposed, a plurality of laterally-spaced trackways disposed in a horizontal plane below the mold bottom and sides and extending transversely of the mold cavity, parallel rows of trucks on the trackways, below the side walls, each row supporting a side wall at various points along the bottom faces of the side wall, and uprights mounted on the trackway, which at their upper ends support the mold bottom, there being a row of these uprights between the two rows of trucks, the trucks of each row being movable relatively to the trucks of the other row, to move the mold sides laterally from the mold bottom.

5. Apparatus as recited in claim 4, wherein the uprights are supported on trucks carried by the trackway.

6. Apparatus as recited in claim 5, wherein the last-named trucks are supported by the trackway at a plane below the first-named trucks.

7. Apparatus for molding concrete building units each of which has a web integrally cast to spaced, oppositely-disposed flanges, the apparatus comprising relatively-spaced pairs of vertical mold sides between which the flanges are respectively formed, a horizontal web-forming cavity above the said sides into which the flange-forming cavities are upwardly exposed, mold bottoms bridging the spaces between the mold sides of said pairs, trackways disposed in a horizontal plane below and transversely of the mold bottoms and the flange-forming cavities, rows of trucks movable along the trackways, the various rows serving to support vertical mold sides at various points longitudinally of the sides and each row of trucks being movable along the tracks independently of the other rows, and rows of uprights extending upwardly from the tracks, with their upper ends supporting the said mold bottoms, each row of uprights supporting one of the said mold bottoms, at various points longitudinally thereof.

8. Apparatus as recited in claim 7, wherein there is a removable mold-bottom web-forming plate that bridges the space between two relatively-spaced pairs of vertical mold sides at their upper edges.

9. Apparatus for molding building units of concrete, comprising a pair of vertical mold sides that are spaced apart to form a horizontally-elongated vertical mold cavity, that is open at its upper edge, horizontally-spaced mold side members adjacent to said upper edge and spaced apart a greater distance than the lower portions of said vertical sides, the spaces between the upper and lower mold sides being open to each other and forming a continuous mold cavity, a mold bottom bridging the space between the said vertical mold sides at their lower edges, trackways disposed in a horizontal plane below and transversely of the mold bottoms and the said cavities, rows of trucks movable along the trackways, each row serving to support a vertical mold side at various points longitudinally of its lower edge and each row of trucks being movable along the tracks independently of the other row, and a row of uprights extending upwardly from the tracks, with their upper ends supporting the said mold bottom at various points longitudinally of the bottom.

References Cited in the file of this patent

UNITED STATES PATENTS

| | | |
|---|---|---|
| 1,163,248 | McGuire | Dec. 7, 1915 |
| 2,007,063 | Roland | July 2, 1935 |
| 2,250,020 | Henderson | July 22, 1941 |
| 2,306,548 | Leemhuis | Dec. 29, 1942 |
| 2,453,223 | Henderson | Nov. 9, 1948 |
| 2,495,100 | Henderson | Jan. 17, 1950 |
| 2,510,810 | Furst | June 6, 1950 |
| 2,511,829 | Arrighini et al. | June 20, 1950 |
| 2,512,092 | Dike et al. | June 20, 1950 |
| 2,583,818 | Cihlar | Jan. 29, 1952 |
| 2,771,656 | Swenson | Nov. 27, 1956 |